(12) United States Patent
Martin (10) Patent No.: US 9,791,582 B2
(45) Date of Patent: Oct. 17, 2017

(54) SEGMENTED-FOIL DIVERTOR (71) Applicant: GX Technology Canada Ltd., Calgary (CA)

(72) Inventor: Daniel George Martin, Woodstock (CA)

(73) Assignee: GX Technology Canada Ltd., Calgary, Alberta (CA)

( * ) Notice: Subject to any disclaimer, the term of this patent is extended or adjusted under 35 U.S.C. 154(b) by 0 days.

(21) Appl. No.: 14/959,009

(22) Filed: Dec. 4, 2015

(65) Prior Publication Data

US 2016/0161622 A1 Jun. 9, 2016

Related U.S. Application Data (60) Provisional application No. 62/087,883, filed on Dec. 5, 2014.

(51) Int. Cl.
| | | |
|---|---|---|
| *B63G 8/14* | (2006.01) | |
| *G01V 1/38* | (2006.01) | |
| *B63B 21/66* | (2006.01) | |
| *B63B 22/00* | (2006.01) | |

(52) U.S. Cl.
CPC .......... *G01V 1/3826* (2013.01); *B63B 21/663* (2013.01); *B63B 22/00* (2013.01)

(58) Field of Classification Search
CPC ...... B63B 21/663; B63B 22/00; G01V 1/3826
See application file for complete search history.

(56) References Cited

U.S. PATENT DOCUMENTS

| | | | |
|---|---|---|---|
| 3,943,483 | A | 3/1976 | Strange |
| 4,365,574 | A | 12/1982 | Norminton |
| 4,404,664 | A | 9/1983 | Zachariadis |
| 4,484,534 | A | 11/1984 | Thillaye du Boullay |
| 4,567,841 | A | 2/1986 | Hale |
| 4,829,929 | A * | 5/1989 | Kerfoot ................. B63B 21/663 114/243 |
| 6,144,342 | A | 11/2000 | Bertheas et al. |
| 6,189,475 | B1 | 2/2001 | Coakley |
| 6,532,189 | B2 | 3/2003 | Barker |
| 6,671,223 | B2 | 12/2003 | Bittleston |
| 7,380,513 | B2 | 6/2008 | Lie |
| 7,404,370 | B2 | 7/2008 | Stokkeland |
| 7,499,373 | B2 | 3/2009 | Toennessen |
| 7,738,317 | B2 | 6/2010 | Toennessen |

(Continued)

FOREIGN PATENT DOCUMENTS

| | | |
|---|---|---|
| DE | 3933398 A1 | 4/1991 |
| EP | 0 884 607 A2 | 12/1998 |

(Continued)

OTHER PUBLICATIONS

The International Search Report and Written Opinion in connection with PCT/CA2015/000593 dated Feb. 22, 2016 (7 pages).

(Continued)

*Primary Examiner* — Stephen Avila
(74) *Attorney, Agent, or Firm* — Dorsey & Whitney LLP (57) ABSTRACT

A segmented-foil divertor for marine towed application, such as marine seismic exploration, having a plurality of longitudinally stackable foil segments with an internal conduit extending along the span of each segment to receive a cable passing therethrough.

26 Claims, 7 Drawing Sheets

(56) References Cited

U.S. PATENT DOCUMENTS

| | | |
|---|---|---|
| 7,755,970 B2 | 7/2010 | Welker et al. |
| 7,793,606 B2 | 9/2010 | Olivier et al. |
| 9,075,165 B2 | 7/2015 | Vageskar et al. |
| 9,244,184 B2 | 1/2016 | Voldsbekk |
| 9,632,195 B2 | 4/2017 | Martin |
| 2006/0176775 A1 | 8/2006 | Toennessen |
| 2008/0029012 A1 | 2/2008 | Stokkeland |
| 2010/0149910 A1 | 6/2010 | Martin |
| 2011/0203509 A1 | 8/2011 | Austad et al. |
| 2012/0067265 A1 | 3/2012 | Valo et al. |
| 2013/0182531 A1 | 7/2013 | Gagliardi et al. |
| 2014/0104985 A1 | 4/2014 | Gagliardi et al. |
| 2014/0247691 A1 | 9/2014 | Martin |
| 2014/0247692 A1 | 9/2014 | Simonnot |
| 2014/0269174 A1 | 9/2014 | Gagliardi et al. |
| 2016/0161622 A1 | 6/2016 | Martin |
| 2017/0106946 A1 | 4/2017 | Schneider |

FOREIGN PATENT DOCUMENTS

| | | |
|---|---|---|
| GB | 108761 A | 8/1917 |
| GB | 2342081 A | 4/2000 |
| GB | 2400662 B | 8/2006 |
| WO | 2010111377 A2 | 9/2010 |
| WO | 2013059926 A1 | 5/2013 |
| WO | 2014145861 A1 | 9/2014 |
| WO | 2016086293 A1 | 6/2016 |
| WO | 2016127245 A1 | 8/2016 |

OTHER PUBLICATIONS

International Search Report and Written Opinion dated Jun. 23, 2017 in connection with International Patent Application No. PCT/IB2017/000209, 11 pages.

* cited by examiner

SEGMENTED-FOIL DIVERTOR

CROSS-REFERENCE TO RELATED APPLICATION

This application claims the benefit of U.S. provisional application No. 62/087,883, which was filed on Dec. 5, 2014, the entirety of which is incorporated herein by reference.

FIELD OF THE INVENTION

The invention relates to divertors and method of using divertors for achieving the desired position of various marine towed seismic equipment.

BACKGROUND OF THE INVENTION

When towing in-water equipment behind a vessel, such as when conducting seismic surveys, it is desirable that the towed equipment be positioned at some lateral offset, either to port or to starboard, with respect to the track of the vessel. To position, or divert, the towed equipment to one side of the vessel or the other, a device is typically deployed in the water that is capable of generating hydrodynamic lift in a direction that is perpendicular to the direction of travel of the vessel. A number of such devices are known and are variously referred to as "divertors", "deflectors", "paravanes", "vanes", and "trawl doors" or simply "doors". As used herein, the term "divertor" or "divertors" refers to all such devices.

Divertors rely on a wing or foil to generate the necessary hydrodynamic lift. Divertor designs range from the use of a single foil or wing, to as many as 5 or more individual foils arranged laterally in a cascading progression, one behind the other. The foils themselves can be simple flat or bent plates, classical air foils, such as NACA, Eppler, or Gottingen series profiles, or proprietary custom foils. The foils may also have features, such as flaps, slats, slots, and wing tips to help achieve maximum lift coefficients and/or minimum drag coefficients. Foil design and features have a significant impact on the divertor's performance, such as, its lift and drag coefficients. The aspect ratio of the divertor is also an important design parameter.

Aspect ratio is the length, or span, of a wing compared to its chord, which is the distance from the leading edge to the trailing edge of the wing. For very low aspect ratios, such as 1:1 or less, the divertor's lift-to-drag ratio may be in the range of 2:1, which is considered poor. As the aspect ratio is increased above 1:1 the lift-to-drag efficiency improves. For example, an aspect ratio of 2:1 can yield lift-to-drag ratios of 4:1 or higher. By continuing to increase the aspect ratio, lift-to-drag efficiencies can be achieved as high as 10:1.

While high aspect ratio divertors generate high lift for minimal drag, they also present operational challenges in terms of deployment and recovery from the vessel. Divertors require dedicated handling gear for launch, retrieval, and onboard stowage, including cradles, davits, overboarding booms, and structural modifications to the side or stern of the vessel. Skilled operators are required to launch these divertors, especially in rough sea states. Generally, long and narrow divertors tend to be more problematic for handling and stowage than short and wide divertors.

Divertors use a fixed bridle of chain, rope, or wire to launch and tow the divertor. The lengths of the bridle legs and their attachment points determine the angle of attack at which the divertor tows through the water and, consequently, how much lift is generated by the divertor. The bridle configuration is set prior to launch, such that the divertor immediately starts generating lift as soon as it enters the water. This presents operational challenges for the operator during launch and retrieval of the divertor, particularly in rough sea states. Prior to launch, the operator must ensure that the divertor is secure and under control while the vessel is pitching and rolling. The operator must also ensure that the divertor enters the water with an attitude that ensures that it remains stable, starts generating lift in the desired direction, and immediately starts pulling away from the vessel. During the interval while the divertor is entering the water, and in close proximity to the vessel as it starts to generate full lift, high snap loads can be produced in the towing cable as the vessel and divertor are both reacting to rough seas.

In order to manage the high dynamic loads generated during launch, retrieval, and towing in rough seas, the mechanical design of divertors requires strong structural members with a thick cross-section. This results in a heavy divertor that places additional demands on the vessel's handling gear. For those applications where the divertor is intended to operate near the surface, a heavy divertor also requires a large surface reference float, which increases the drag of the divertor, as well the requirements for handling and stowage.

SUMMARY OF THE INVENTION

According to one aspect of the present invention a collapsible segmented-foil divertor provides a high lift-to-drag efficiency with reduced demand on the tow vessel's handling gear.

In one embodiment, the collapsible segmented-foil divertor comprises a plurality of longitudinally stackable foil segments each having a foil cross-section, a leading edge, a trailing edge, a span, and an internal conduit extending along the span positioned rearward of the leading edge of the foil segment to receive a cable passing therethrough.

In another embodiment, the collapsible segmented-foil divertor comprises a stack of foil segments having opposing ends and a cable passing through the internal conduits of each of the plurality of foil segments and having a free end extending outwardly from each end of the stack.

In another embodiment, the collapsible segmented-foil divertor comprises a triangular-like bridle having an apex, sides, and a base, wherein the apex is defined by a connection point between the bridle and rigging on a towing vessel; the sides are defined by a first bridle line attached between the connection point and one free end of the cable and a second bridle line attached between the connection point and the other free end of the cable; and the base is defined by the cable; and one or more intermediate bridle lines attached between the connection point and the cable.

In another embodiment, the collapsible segmented-foil divertor comprises a float mechanism at one end of the stack defining a top end of the stack.

According to another aspect of the present invention a method of launching a collapsible segmented-foil divertor, comprises the steps of:

connecting the master link to the rigging;

connecting the second bridle line and one or more intermediate bridle lines to one or more winches;

adjusting the length of the second bridle line and one or more intermediate bridle lines, by way of the one or more winches, so as to provide slack during the launching operation;

launching the collapsible segmented-foil divertor into the water from the ship;

paying out the rigging until the collapsible segmented-foil divertor is located a desired distance from the ship;

shortening the length of the second bridle line and one or more intermediate bridle lines, by way of the one or more winches, so as to achieve the desired angle and alignment of the collapsible segmented-foil divertor;

disconnecting the second bridle line and one or more intermediate bridle lines from the one or more winches; and connecting the second bridle line and one or more intermediate bridle lines to the rigging.

BRIEF DESCRIPTION OF THE DRAWINGS

In order that the invention may be more clearly understood, embodiments thereof will now be described in detail by way of example, with reference to the accompanying drawings, in which.

DESCRIPTION OF THE INVENTION

The collapsible segmented-foil divertor, according to the present invention, provides a high aspect ratio wing, for a high lift-to-drag efficiency, that facilitates the launch, retrieval, handling, and stowage operations associated with tall narrow divertors. This may be achieved, in one embodiment, by a segmented-foil divertor, which comprises a wing having, by way of example a 10 m span and a 1 m chord, yielding an aspect ratio of 10:1. The wing is comprised of individual foil segments 1 stacked end-to-end, for example 10 foil segments 1 each having a 1 m span. The foil segments 1 are held together by at least one rope, or conduit cable 2, which is threaded through an internal conduit 3 in each foil segment 1. When the conduit cable 2 is slack, the end to end assembly, or stack 4, of foil segments is flexible, or collapsible, and can be folded and unfolded on deck and manipulated on deck and over obstructions, and deployed over a bulwark or down a dedicated deployment chute at the stern of the vessel. Once the conduit cable 2 is tensioned, as described hereafter, the collapsible segmented-foil divertor becomes semi-rigid and takes the form of a continuous wing as it deploys into the water. This reduces the demand on the handling gear on the vessel for launch, retrieval, and onboard stowage and handling of the collapsible segmented-foil divertor, compared to known tall narrow divertors. Although the segmented-foil divertor, according to the present invention, is described herein with reference to the example application in marine seismic exploration, the segmented-foil divertor may be applied to any marine, towed application where divertors or depressors are used.

Figure 1:
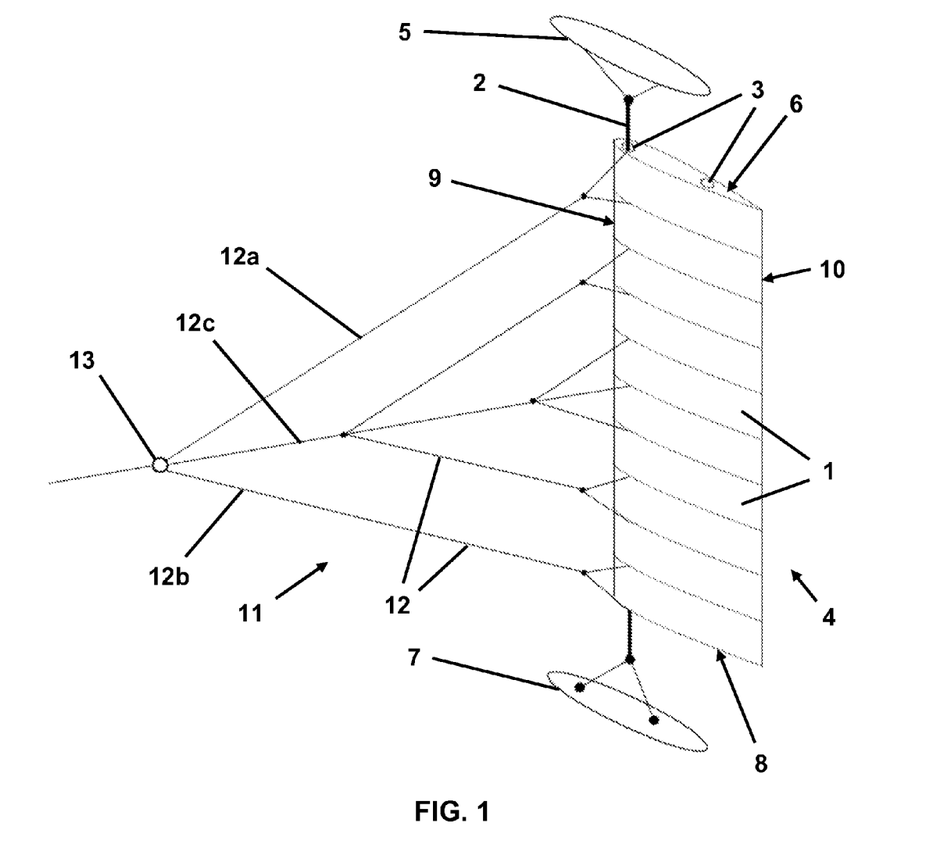
FIG. 1 is a perspective view of a segmented-foil divertor, according to the present invention.
Figure 2:
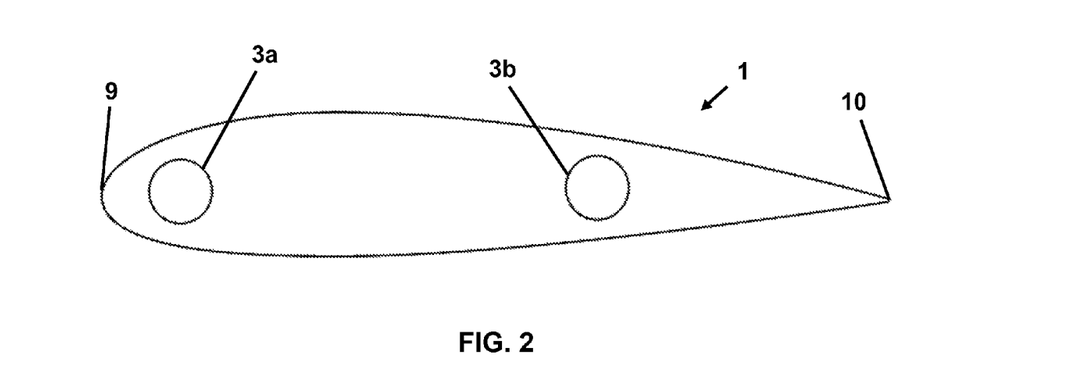
FIG. 2 is cross-section view of a foil segment.

As shown in FIGS. 1 and 2, the collapsible segmented-foil divertor is constructed with a plurality of longitudinally stacked foil segments 1. The individual foil segments 1 are stackable longitudinally adjacent one another, or end-to-end, to provide a divertor with the desired aspect ratio. Each foil segment 1 has a span, a chord, and a foil cross-section, which may be a standard hydrofoil cross-section, as shown in FIG. 2, or may be any other desired foil cross-section, such as NACA, Eppler, Gottingen, or any other custom foil cross-section suitable for the desired application.

A float mechanism vertically references the stack 4 of foil segments while the segmented-foil divertor is being towed through the water. Preferably, the float mechanism is a surface reference float 5, or buoy, attached to an end of the stack 4 to define a top end 6 of the stack. Alternatively, the float mechanism may be buoyant material integral to one or more foil segments 1, thereby adjusting the relative buoyancy of the foil segments 1 in the stack 4. For example, one or more of the foil segments 1 at or near the top end 6 of the stack 4 may be provided with a buoyant material, such as a syntactic foam, within a cavity inside the foil segment 1. Preferably, a portion of the internal cross-sectional volume of the foil segment 1 would be made of buoyant material and the outer shell of the foil segment 1 would provide desired the structural characteristics. The stack 4 of foil segments may also be provided with a ballast 7 attached to the end of the stack opposite the float mechanism, or the bottom end 8. The ballast 7 may also be integral to one or more foil segments 1 at or near the bottom end 8 of the stack 4.

Figure 3A:
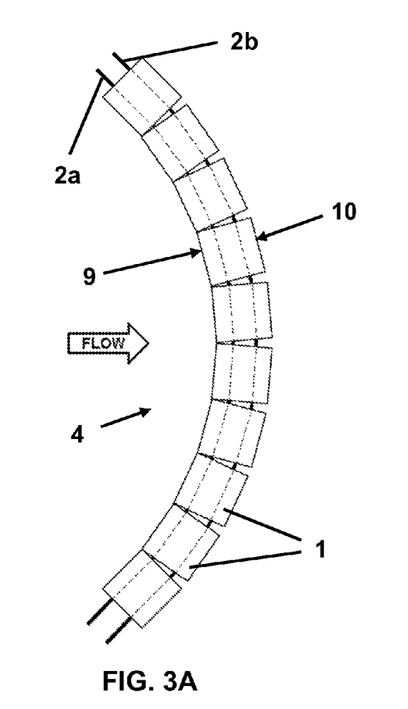
FIG. 3A is a side view of a stack of foil segments, in one embodiment.
Figure 3B:
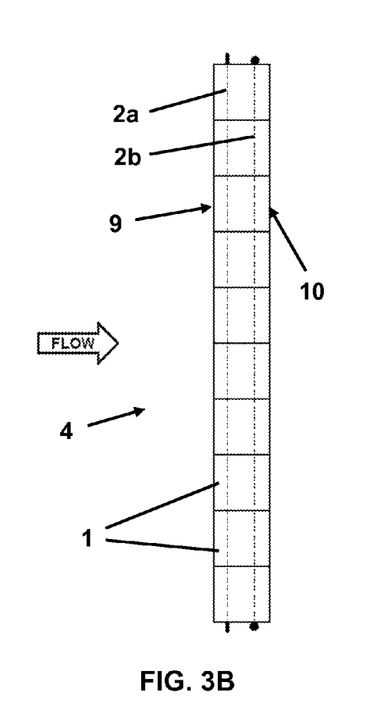
FIG. 3B is a side view of a stack of foil segments, in another embodiment.

As shown in FIGS. 1, 2, 3A, and 3B, forward and aft internal conduits 3a and 3b extend along the span of each foil segment 1 to receive a conduit cable 2 passing therethrough and having a free end extending outwardly from each end of the stack 4. Preferably, each foil segment has a forward internal conduit 3a, positioned rearward of the leading edge 9, and an aft internal conduit 3b, positioned forward of the trailing edge 10, spaced apart from one another. Alternatively, each foil segment 1 may have a single internal conduit 3, positioned rearward of the leading edge 9. A cable, rope, wire, chain, or other type of rigging line passes through the internal conduits of each of the plurality of foil segments 1 and is preferably secured at either end of the stack 4 of foil segments 1, for example by knotting the cable to prevent egress, as shown in FIG. 3B. Preferably, two conduit cables 2 are used, with a forward conduit cable 2a passing through the forward internal conduits 3a and an aft conduit cable 2b passing through the aft internal conduits 3b. The aft conduit cable 2b is optional, and provides additional structural support to the segmented-foil divertor and prevents fan-tailing, as shown in FIGS. 3A and 3B.

Figure 4:
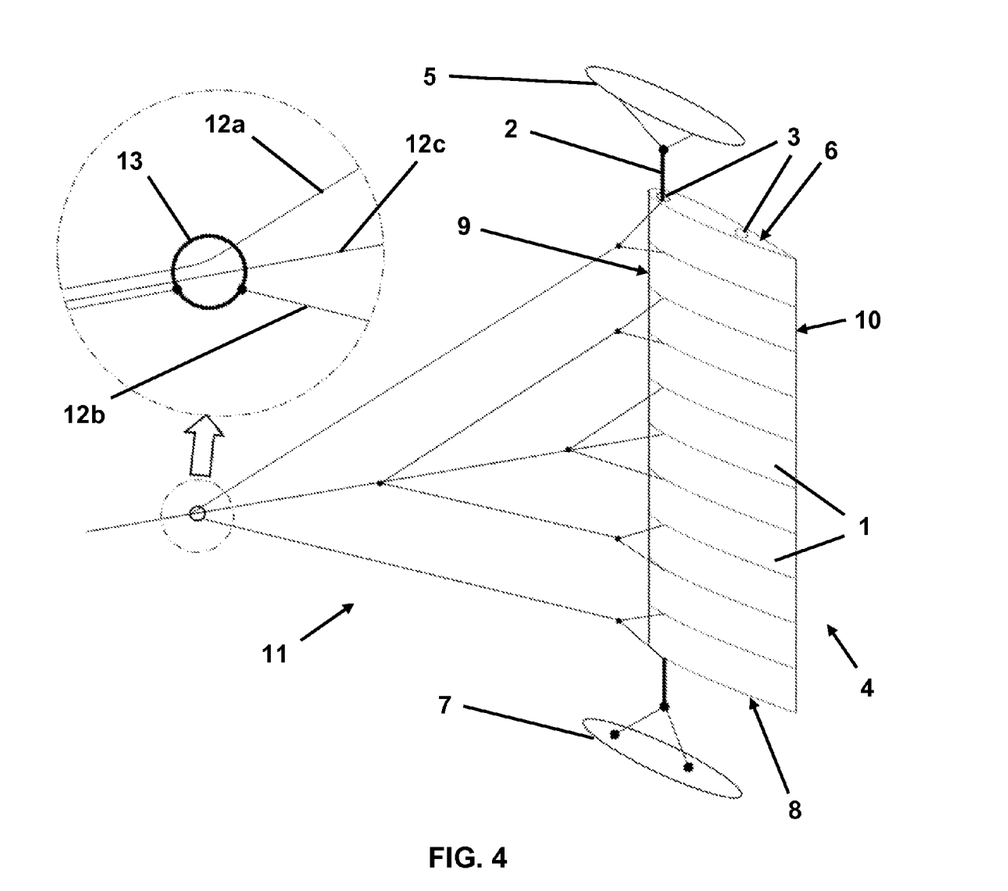
FIG. 4 is a perspective view of another embodiment of a segmented-foil divertor, according to the present invention, with an expanded view of the master link.

A triangular-like bridle 11 is attached at one end to the rigging on a towing vessel, for example to a tow rope, and at the other end to the stack 4 of foil segments 1, as shown in FIGS. 1 and 4. The bridle 11 has an apex, sides, and a base, defining its triangular-like shape. The apex is defined by a connection point between the bridle 11 and the rigging. The sides are defined by a number of legs, or bridle lines 12. A first bridle line 12a is attached between the connection point and one end, the top end 6, of the stack 4 and a second bridle line 12b is attached between the connection point and the other end, the bottom end 8, of the stack 4. One or more intermediate bridle lines 12c are also attached between the connection point and the stack 4 between the opposing ends of the stack 4. Optionally, branching bridle lines 12 are used to complete the bridle rigging, as shown in FIGS. 1 and 4. Preferably, the bridle lines 12 attach to the plurality of foil segments 1 by way of attachment to the forward conduit cable 2a at each free end of the forward conduit cable 2a extending outwardly from each end of the stack 4 and in between each foil segment 1. Optionally, the free ends of the forward conduit cable 2a may be continuous with the bridle lines 12. Alternatively, the bridle lines 12 may be attached directly to one or more of the plurality of foil segments 1.

Figure 8:
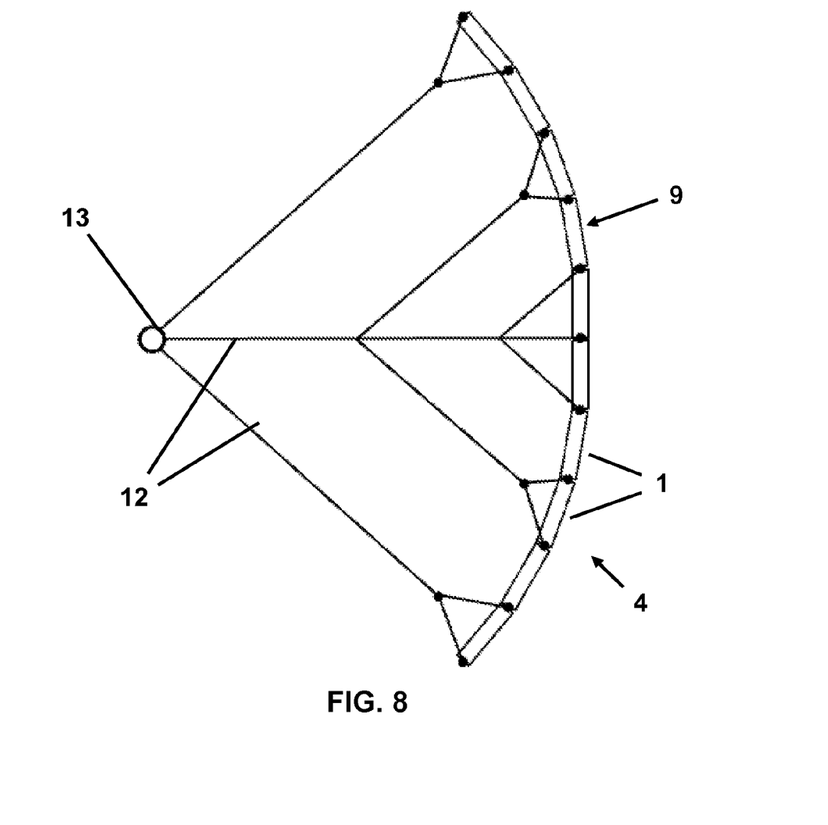
FIG. 8 is a schematic front view of the segmented-foil divertor, illustrating a curved stack.
Figure 9:
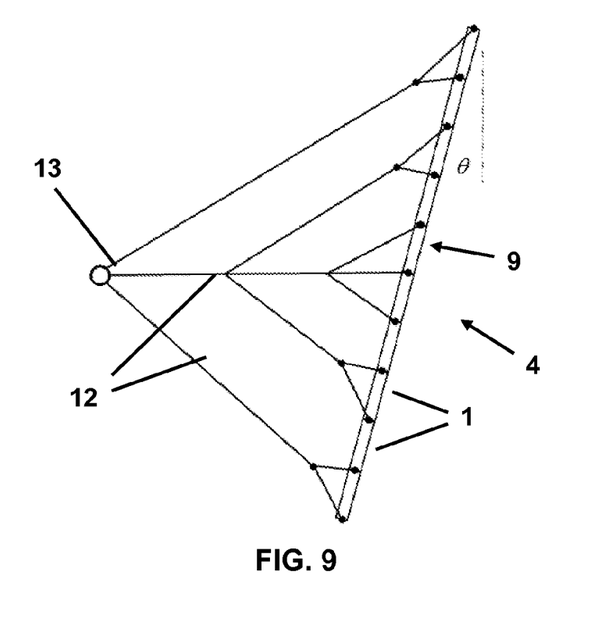
FIG. 9 is a schematic front view of the segmented-foil divertor, illustrating an angled stack.
Figure 11:
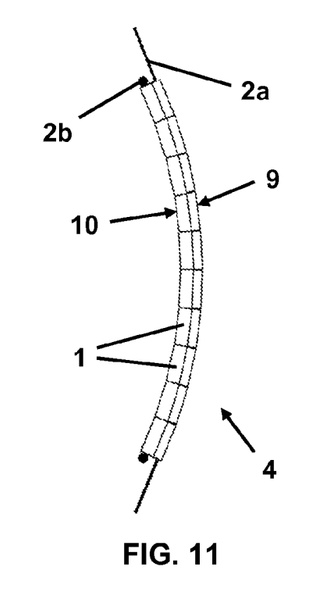
FIG. 11 is a schematic front view of the stack shown in FIG. 10, with the aft conduit cable tightened.

The length of the bridle lines 12 are selected to maintain a vertical and linear, or longitudinally aligned, stack 4 of foil segments 1 when the segmented-foil divertor is being towed through the water, as shown in FIGS. 1, 4, and 9. In this embodiment, the sides of the bridle 11 are of equal length. Alternatively, the relative length of the bridle lines 12 on the top half of the stack 4 may be selected to be longer than those on the bottom half of the stack 4 to maintain an angled stack 4, as shown by the angle θ in FIG. 9. In this embodiment, the sides of the bridle 11 are of unequal length. The positive or negative angle θ by which the stack 4 is offset from the vertical, as shown in FIG. 9, may be selected to produce a force with a component in the vertical (upward or downward) direction. This enables the segmented-foil divertor to be used both as a divertor to position the towed equipment laterally to one side or the other of the towing vessel, and also as a depressor to position the towed equipment at a desired depth. Alternatively, the length of the bridle lines 12 may be selected to maintain a curved stack 4, as shown in FIGS. 8 and 11. Bridle line lengths are thus selected to impart the desired stack shape to the segmented-foil divertor.

The bridle 11 may be fixedly attached at a single connection point, such as a master link 13, on the rigging, as shown in FIG. 1. Alternatively, as shown in FIG. 4, the bridle line 12b attached to the bottom end 8 of the stack 4 of foil segments 1, is attached directly to a master link 13 and the remaining bridle lines 12 are threaded through the master link 13 and attached to the rigging at a separate connection point further upstream of the master link 13. This bridle configuration permits the segmented-foil divertor to be "de-powered" during deployment and recovery, as will be described hereinafter.

Figure 10:
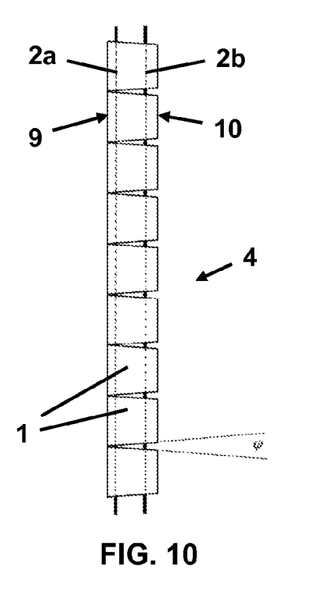
FIG. 10 is a schematic side view of a stack of trapezoidal foil segments.

Optionally, as shown in FIG. 10, the sides 14 of the foil segments 1 converge rearwardly, such that the span decreases from the leading edge 9 to the trailing edge 10 to provide each foil segment 1 with a trapezoidal shape and a wedged gap, or divergent angle φ, between foil segments 1. Preferably, the trapezoidal foil segments 1 are used in combination with a bridle 11 configured to maintain a curved stack 4, as shown in FIG. 8. In this configuration, the length of the aft conduit cable 2b passing through the aft internal conduits 3b of the stack 4 may be selectively shortened to draw the rear edges of the foil segments 1 together and close the divergent angle φ, as shown in FIG. 11. As the rear edges of the foil segments 1 are drawn together, each foil segment 1 rotates about the forward conduit cable 2a, changing its angle of attack as it is towed through the water. This occurs because the combined length of the leading edges 9 of the plurality of foil segments 1 is longer than the combined length of the trailing edges 10. An adjuster mechanism may be connected to the aft conduit cable 2b to operationally and selectively shorten or lengthen the aft conduit cable 2b to adjust the angle of attack of the foil segments 1 in the segmented-foil divertor. Preferably, the adjuster mechanism is located within the surface reference float 5, or other suitable pod or container mounted at either the top or bottom end 6 or 8 of the stack 4. Adjusting the angle of attack results in more or less lift from each foil segment 1. Maximum lift is achieved when the divergent angle φ is completely closed. Accordingly, the overall amount of lift produced by the segmented-foil divertor may be controlled selectively by the adjuster mechanism as the segmented-foil divertor is towed through the water. This may be controlled automatically or manually by an operator on the towing vessel, by known methods of remote controlling towed equipment. Alternatively, the length of the aft conduit cable 2b may be set at the time of deployment.

Figure 7:
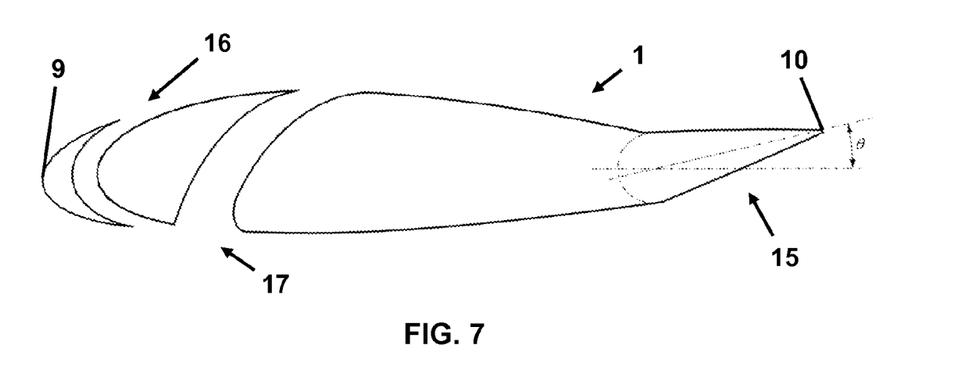
FIG. 7 is a schematic cross-sectional view of a foil segment, illustrating foil characteristics and features.

The amount of lift produced by the segmented-foil divertor may be selected, without adjusting the angle of attack of the foil segments 1, in a number of ways. The chord and span of each foil segment 1 may be selected to adjust the lift, as well as the number of foil segments 1 included in the stack 4. The cross-section of each foil segment 1 may also be selected to adjust the lift characteristics of the segmented-foil divertor. As shown in FIG. 7, a number of foil cross-sections and special features may be used. Any desired foil cross-section, such as those found in the UIUC foil database, may be used. Special features, such as cambers, wing fences, winglets, flaps 15, slats 16, and slots 17 may also be used to adjust the hydrodynamic properties of each foil segment 1. Preferably, all the foil segments 1 in the segmented-foil divertor are identical. Alternatively, the span, chord, cross-section, and special features of each foil segment 1 may be selected individually to provide the desired hydrodynamic characteristics to the segmented-foil divertor. For example, the span, chord, and cross-section of the foil segments 1 may be selected to provide the segmented-foil divertor with an overall configuration resembling a tapered wing.

In one embodiment, the stack 4 of segmented foils 1 are free to rotate about the forward conduit cable 2a in order to find their equilibrium angle of attack. An aft conduit cable 2b may be used to prevent fan-tailing, as shown in FIG. 3B. The plurality of foil segments 1 find their equilibrium angle of attack according to the foil characteristics and the location of the forward internal conduit 3a within the cross-section of the foil segments 1. The equilibrium angle of attack may also be adjusted by providing a tail flap 15 and by adjusting the tail flap length and angle, as shown in FIG. 7.

In another embodiment, the float mechanism and optional ballast 7 may be configured to provide the segmented-foil divertor with any desired overall buoyancy, such as a neutral buoyancy. This permits the segmented-foil divertor to operate below the surface. This may also be accomplished without separate floats 5 and ballasts 7, by adjusting the buoyancy of the individual foil segments 1. Each foil segment 1 can be configured with its own positive or negative buoyancy to suit individual deployment and operating depth objectives.

In another embodiment, the amount of lift being generated by the segmented-foil divertor may be controlled by adjusting the bend angle of the tail flaps 15 located along the trailing edge 10 of each foil segment 1 in the stack 4. This may be accomplished by including a rotatable tail flap 15, controlled by means of an internal control module and adjustment mechanism, or flap actuator, mounted within the cross-section of each foil segment 1. Remote communication between the vessel and the control module in each foil segment 1 may be accomplished by replacing one of the two conduit cables 2 with a cable that included conductors and/or optical fibres, with said cable having multiple take-outs and connectors—one for each foil segment 1 in the stack 4.

Figure 12:
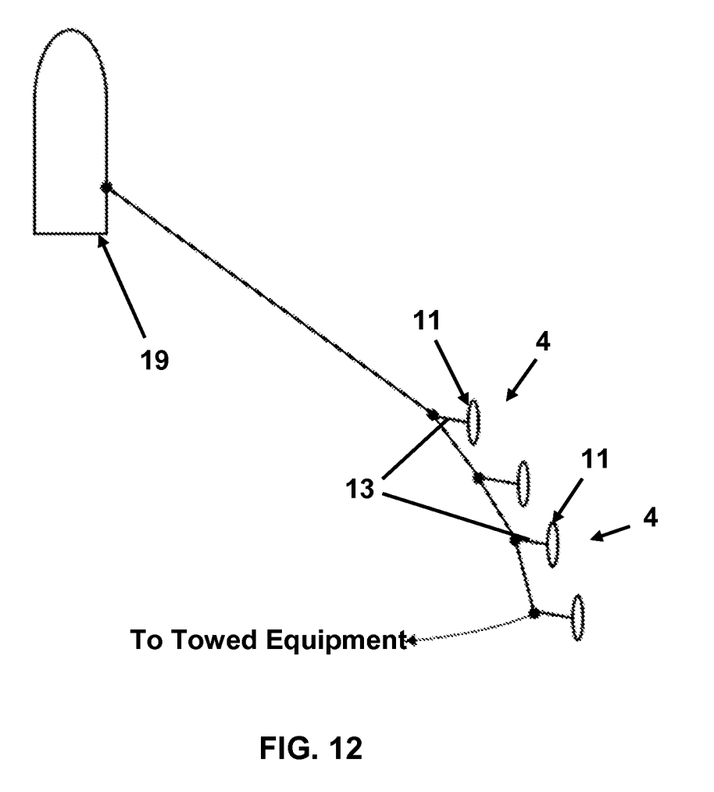
FIG. 12 is a partial schematic view of rigging on a towing vessel with more than one segmented-foil divertor attached thereto.

In some instances it may be desirable to install multiple segmented-foil divertors along the same length of rigging to achieve higher levels of hydrodynamic lift, as shown in FIG. 12. Preferably, the segmented-foil divertor is attached to the main tow rope via the master link 13, but various types of main tow cables may be used, including wire cables, electro-optical-mechanical cables (lead-in cables), umbilical cables, ropes, or combinations thereof. Similarly, the master link 13 could also be replaced with other known means of attaching a divertor to the main tow cable.

Preferably, the span of each foil segment 1 is relatively small and supported at both ends by one of the bridle lines 12, as shown in FIGS. 1 and 4. This provides a flexible structure for handling purposes and also reduces the magnitude of lift and drag forces exerted on each foil segment 1. As a result, the structural demands on each foil segment 1 are lower than if a stack 4 of the same dimensions were made of fewer, larger foil segments 1. This permits the foil segments 1 to be made from light weight plastics and composites. Consequently, the submerged weight of the segmented-foil divertor can be kept to a minimum, such that only a very small float mechanism is required, or in some embodiments, no float mechanism is required.

The segmented-foil divertor facilitates easy deployment and recovery in several ways. First, for ease of handling, both the forward and aft conduit cables 2a and 2b remain slack while the segmented-foil divertor is onboard. Once deployed, the conduit cables 2 are brought under tension in order for the segmented-foil divertor to hold its form. The transition from slack to taut is accomplished separately for the forward and aft conduit cables 2a and 2b. Preferably, the aft conduit cable 2b is anchored to the top end 6 of the uppermost foil segment 1 via a knot, shackle, or other suitable means. If a separate float mechanism is used, it is first launched down the stern chute, and into the water so that it starts to apply sufficient drag force to pull the remainder of the segmented-foil divertor down the deployment chute and into the water. Just prior to the last foil segment 1 beginning to enter the chute, deployment is briefly halted so that the aft conduit cable 2b can be tensioned. A utility winch can be used to tension the aft conduit cable 2b, thereafter a pin or shackle is inserted through the aft conduit cable 2b to prevent it from sliding back up inside the opening of the aft internal conduit 3b. The aft conduit cable 2b thereby remains tensioned, helping to stiffen and align the segmented-foil divertor as deployment continues and the stack 4 of foil segments 1 fully enters the water. The taut aft conduit cable 2b also prevents the segmented-foil divertor from fan-tailing due to the hydrodynamic drag forces acting on the wing, as shown in FIG. 3A.

The forward conduit cable 2a begins to come under tension as the segmented-foil divertor transitions from a horizontal orientation, as it first enters the water, to a vertical orientation once fully deployed. The top of the forward conduit cable 2a is connected to the float mechanism, which applies a vertical tensioning force in the upwards direction. The bottom end of the forward conduit cable 2a is knotted, or otherwise prevented from sliding up into the forward internal conduit 3a of the bottommost foil segment 1, such that the weight of the stack 4 of foil segments 1 pushes down against the knot, thereby providing a downwards, opposing force to the upwards force provided by the float mechanism. Alternatively, the bottom end of the forward conduit cable 2a can be tied off to a ballast pod 7 of comparable size to the surface reference float 5 to provide additional tensioning force to the forward conduit cable 2a.

Figure 5:
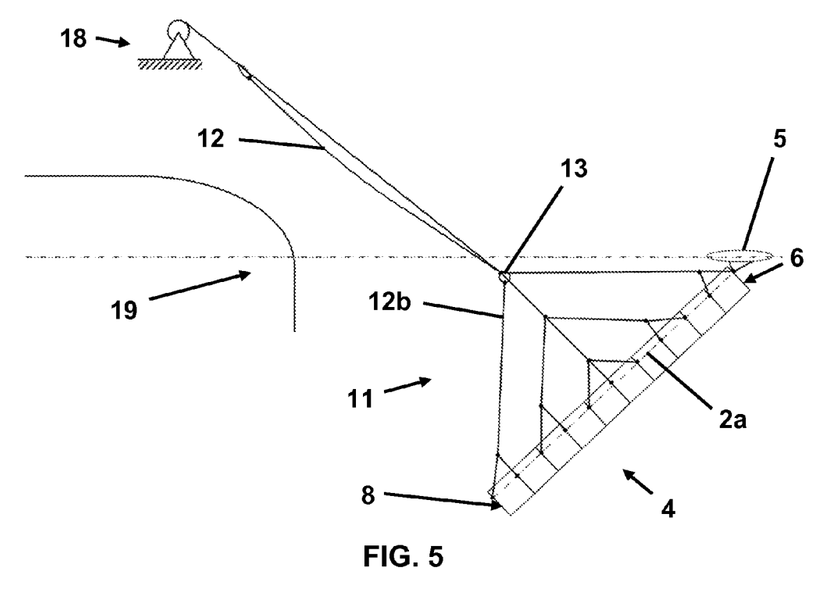
FIG. 5 is a schematic view of the segmented-foil divertor, illustrating the launch and recovery procedure from a towing vessel.
Figure 6:
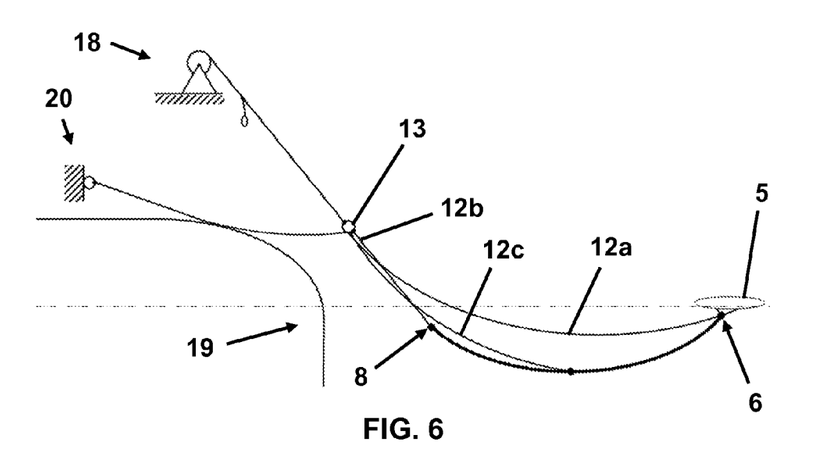
FIG. 6 is a schematic view of the segmented-foil divertor, illustrating a de-powered segmented-foil divertor during the launch and recovery procedure from a towing vessel.

A second way in which the segmented-foil divertor facilitates easy deployment and recovery is through its ability to be de-powered during deployment and recovery operations, as shown in FIGS. 5 and 6. As used herein, the term "de-powered" refers to the operational reduction of the hydrodynamic lift, produced by the segmented-foil divertor, to substantially zero. As a result of de-powering the segmented-foil divertor, high snap loads can be reduced or avoided, the divertor can be launched and recovered under low tension, and the segmented-foil divertor's lift force can be gradually powered up or down in a controllable fashion. This is accomplished by adjusting the bridle lines 12 attached to the ends of the stack 4 of foil segments at the time of deployment and recovery. As shown in FIG. 4, only the bottom bridle line 12b is attached directly to the master link 13, which is attached directly to the rigging. The upper and intermediate bridle lines 12a and 12c pass through the master link 13, and are connected, for example to a pigtail eye splice inserted into the rigging, at some convenient distance upstream of the master link 13.

During recovery, the segmented-foil divertor is brought in close to the vessel by the main tow winch 18 until the eye splice is accessible at the stern 19 of the vessel, as shown in FIG. 5. The upper and intermediate bridle lines 12a and 12c are disconnected from the eye splice and reconnected to the free end of a utility tagline connected to a back deck utility winch 20. The utility winch 20 can then begin to payout the bridle lines 12a and 12c, thus causing the float mechanism and the top end 6 of the stack 4 to move further aft, and the segmented-foil divertor to gradually transition from its full power vertical orientation to a substantially zero power horizontal orientation. Once the upper and intermediate bridle lines 12a and 12c are completely slack and the stack 4 is trailing directly aft of the vessel, the towing burden of the horizontal segmented-foil divertor is supported only by the bottom bridle line 12b, as shown in FIG. 6.

With the segmented-foil divertor now trailing and aligned straight aft of the vessel in a fully de-powered state, it can then be pulled up the launch and recovery chute at the stern 19 of the vessel until the lower most foil segment 1 is accessible, at which time the aft conduit cable 2b can be de-tensioned. Then the rest of the segmented-foil divertor can be pulled onboard and left on deck or disassembled for stowage. Deployment of the segmented-foil divertor is accomplished in like fashion, but in reverse order.

The scope of the following claims should not be limited by the preferred embodiments set forth herein, but should be given the broadest interpretation consistent with the specification as a whole.

What is claimed is:
1. A collapsible segmented-foil divertor comprising
a plurality of longitudinally stackable foil segments arranged in a stack with opposing ends, wherein each foil segment defines a foil cross-section, a leading edge, a trailing edge, a span, and an internal conduit extending along the span positioned rearward of the leading edge of the foil segment;

a cable passing through the internal conduits of each of the plurality of foil segments and having a respective free end extending outwardly from each opposing end of the stack;

a triangular-like bridle having an apex, sides, and a base, wherein:

the apex is defined by a connection point between the bridle and rigging trailing behind a towing vessel;

the sides are defined by a first bridle line attached between the connection point and one free end of the cable and a second bridle line extending between the connection point and the other free end of the cable; and the base is defined by the cable; and one or more intermediate bridle lines extending between the connection point and the cable.

2. The collapsible segmented-foil divertor of claim 1, further comprising a float mechanism at one end of the stack defining a top end of the stack.

3. The collapsible segmented-foil divertor of claim 2, wherein the float mechanism is a buoy.

4. The collapsible segmented-foil divertor of claim 2, wherein the float mechanism is buoyant material integral to one or more foil segments at the top end of the stack.

5. The collapsible segmented-foil divertor of claim 2, further comprising a ballast at the other end of the stack defining a bottom end of the stack.

6. The collapsible segmented-foil divertor of claim 5, wherein the ballast is integral to one or more foil segments at the bottom end of the stack.

7. The collapsible segmented-foil divertor of claim 2, wherein the stack is longitudinally aligned, the sides of the bridle are of equal length, and the lengths of the one or more intermediate bridle lines are sized accordingly.

8. The collapsible segmented-foil divertor of claim 2, wherein the stack is longitudinally aligned, the sides of the bridle are of unequal length, and the lengths of the one or more intermediate bridle lines are sized accordingly.

9. The collapsible segmented-foil divertor of claim 2, further comprising a second internal conduit in each foil segment extending along the span positioned forward of the trailing edge of the foil segment to receive a second cable passing therethrough; and a second cable passing through the second internal conduits of each of the plurality of foil segments and having a free end extending outwardly from each end of the stack and secured to prevent egress therefrom.

10. The collapsible segmented-foil divertor of claim 9, wherein each foil segment has opposing sides which converge rearwardly from the leading edge to give each foil segment a trapezoidal-like shape with a divergent angle between the sides of adjacent foil segments.

11. The collapsible segmented-foil divertor of claim 10, further comprising an adjustment mechanism to vary the length of the second cable passing through the second internal conduits of the plurality of foil segments and resultantly vary the size of the divergent angle between a maximum and a minimum.

12. The collapsible segmented-foil divertor of claim 10, wherein the stack is curved, the sides of the bridle are of equal length, and the lengths of the one or more intermediate bridle lines are sized accordingly.

13. The collapsible segmented-foil divertor of claim 10, wherein the stack is curved, the sides of the bridle are of unequal length, and the lengths of the one or more intermediate bridle lines are sized accordingly.

14. The collapsible segmented-foil divertor of claim 2, wherein the cross-section of each of the plurality of foil segments is identical.

15. The collapsible segmented-foil divertor of claim 2, wherein one or more foil segments have a first cross-section and another one or more foil segments have a second cross-section.

16. The collapsible segmented-foil divertor of claim 2, wherein one or more foil segments comprises one or more foil structures selected from the group consisting of: a leading edge slat, a slot, and a trailing edge flap.

17. The collapsible segmented-foil divertor of claim 16, wherein one or more foil segments comprise a trailing edge flap and a flap actuator mounted within the cross-section of the one or more foil segments to selectively adjust the bend angle of the trailing edge flap.

18. The collapsible segmented-foil divertor of claim 2, wherein the connection point of the bridle is a master link having an aperture therethrough and wherein the first bridle line is attached to the master link and the second bridle line and one or more intermediate bridle lines pass through the aperture in the master link and are attached to the rigging further upstream from the master link.

19. A method of positioning towed equipment behind a towing vessel, comprising:

passing a cable through an internal conduit in each of a plurality of longitudinally stackable foil segments each having a foil cross-section, a leading edge, a trailing edge, a span, and an internal conduit extending along the span positioned rearward of the leading edge of the foil segment to receive a cable passing therethrough;

attaching a triangular-like bridle having an apex, sides, and a base, wherein:

the apex is defined by a connection point between the bridle and rigging on the towing vessel;

the sides are defined by a first bridle line attached between the connection point and one free end of the cable and a second bridle line extending between the connection point and the other free end of the cable; and the base is defined by the cable and one or more intermediate bridle lines extending between the connection point and the cable; and towing the plurality of foil segments through the water behind the towing vessel.

20. A method of launching a collapsible segmented-foil divertor-according to claim 18, the method comprising:

providing the collapsible segmented foil diverter;

connecting the master link to the rigging;

connecting the second bridle line and one or more intermediate bridle lines to one or more winches on the towing vessel;

adjusting the length of the second bridle line and one or more intermediate bridle lines, by way of the one or more winches, so as to provide slack during the launching operation;

launching the collapsible segmented-foil divertor into the water from the towing vessel;

paying out the rigging until the collapsible segmented-foil divertor is located a desired distance from the towing vessel;

shortening the length of the second bridle line and one or more intermediate bridle lines, by way of the one or more winches, so as to achieve the desired angle and alignment of the collapsible segmented-foil divertor;

disconnecting the second bridle line and one or more intermediate bridle lines from the one or more winches; and connecting the second bridle line and one or more intermediate bridle lines to the rigging.

21. A method of recovering a collapsible segmented-foil divertor according to claim 18, the method comprising reeling in the rigging until the second bridle line and one or more intermediate bridle lines are accessible at a stern of the towing vessel;

disconnecting the second bridle line and one or more intermediate bridle lines from the rigging;

connecting the second bridle line and one or more intermediate bridle lines to one or more winches on the towing vessel;

lengthening a length of the second bridle line and lengths of one or more intermediate bridle lines, by way of the one or more winches on the towing vessel, so as to provide slack;

reeling in the rigging to bring the segmented-foil divertor on or near the stern of the towing vessel.

22. A collapsible segmented-foil divertor comprising a plurality of longitudinally stackable foil segments arranged in a stack with opposing ends, wherein each foil segment defines a foil cross-section, a leading edge, a trailing edge, a span, and an internal conduit extending along the span positioned rearward of the leading edge of the foil segment;

a cable passing through the internal conduits of each of the plurality of foil segments and having a respective free end extending outwardly from each opposing end of the stack;

a plurality of bridle lines attached at first ends to the cable adjacent to foil segments in the stack and having second ends configured for attachment to rigging extending from a towing vessel.

23. The collapsible segmented-foil divertor of claim 22, wherein two of the plurality of bridle lines attach to the cable adjacent to a top end of the stack and adjacent to a bottom end of the stack, respectively.

24. The collapsible segmented-foil divertor of claim 22, wherein each of the plurality of bridle lines attaches to the cable between adjacent foil segments in the stack.

25. The collapsible segmented-foil divertor of claim 22, wherein the second ends of each of the plurality of bridle lines attaches to another of the plurality of bridle lines.

26. The collapsible segmented-foil divertor of claim 22, wherein the second ends of some of the plurality of bridle lines attach to a connection point that is configured to attach to the rigging.

* * * * *